US006645389B2

(12) United States Patent
Lai

(10) Patent No.: US 6,645,389 B2
(45) Date of Patent: Nov. 11, 2003

(54) METHOD OF DEMETALLIZING A WEB IN AN ETCHANT BATH AND WEB SUITABLE THEREFOR

(75) Inventor: Laurence M. C. Lai, Mississauga (CA)

(73) Assignee: Graphic Packaging Corporation, Golden, CO (US)

( * ) Notice: Subject to any disclaimer, the term of this patent is extended or adjusted under 35 U.S.C. 154(b) by 0 days.

(21) Appl. No.: 10/216,046

(22) Filed: Aug. 9, 2002

(65) Prior Publication Data

US 2003/0035938 A1 Feb. 20, 2003

Related U.S. Application Data

(60) Provisional application No. 60/311,580, filed on Aug. 10, 2001, and provisional application No. 60/311,397, filed on Aug. 9, 2001.

(51) Int. Cl.$^7$ .............................. B44C 1/22; C23F 1/00
(52) U.S. Cl. .............................. 216/41; 216/13; 216/20; 216/100; 428/209; 428/195
(58) Field of Search .............................. 216/13, 20, 41, 216/100; 428/209, 195

(56) References Cited

U.S. PATENT DOCUMENTS

| 3,913,219 A | 10/1975 | Lichtblau |
| 5,059,279 A | 10/1991 | Wilson ........................ 156/651 |
| 5,340,436 A | 8/1994 | Beckett |
| 5,754,110 A | 5/1998 | Appalucci et al. |

Primary Examiner—William A. Powell
(74) Attorney, Agent, or Firm—Dorsey & Whitney LLP

(57) ABSTRACT

A variety of etching bath-based demetallizing processes for making various products involve immersing a web of metal-containing material in a bath of aqueous etchant. The metal-containing material is protected by a pattern of etch-resistant material during the demetallizating process to form functional features having a function in the product in the metal-containing material when the web has been demetallized. The metal-containing material is also protected by a pattern of etch-resistant material over areas of the metal-containing material that serve no function in the product, but rather function in one or more ways to improve the chemical milling process, such as, for example, by extending the etchant bath life, preventing excessive heat generation in the etchant bath, maintaining the etchant bath stable and controllable, increasing web rigidity, and imparting predetermined flex characteristics to the web.

52 Claims, 6 Drawing Sheets

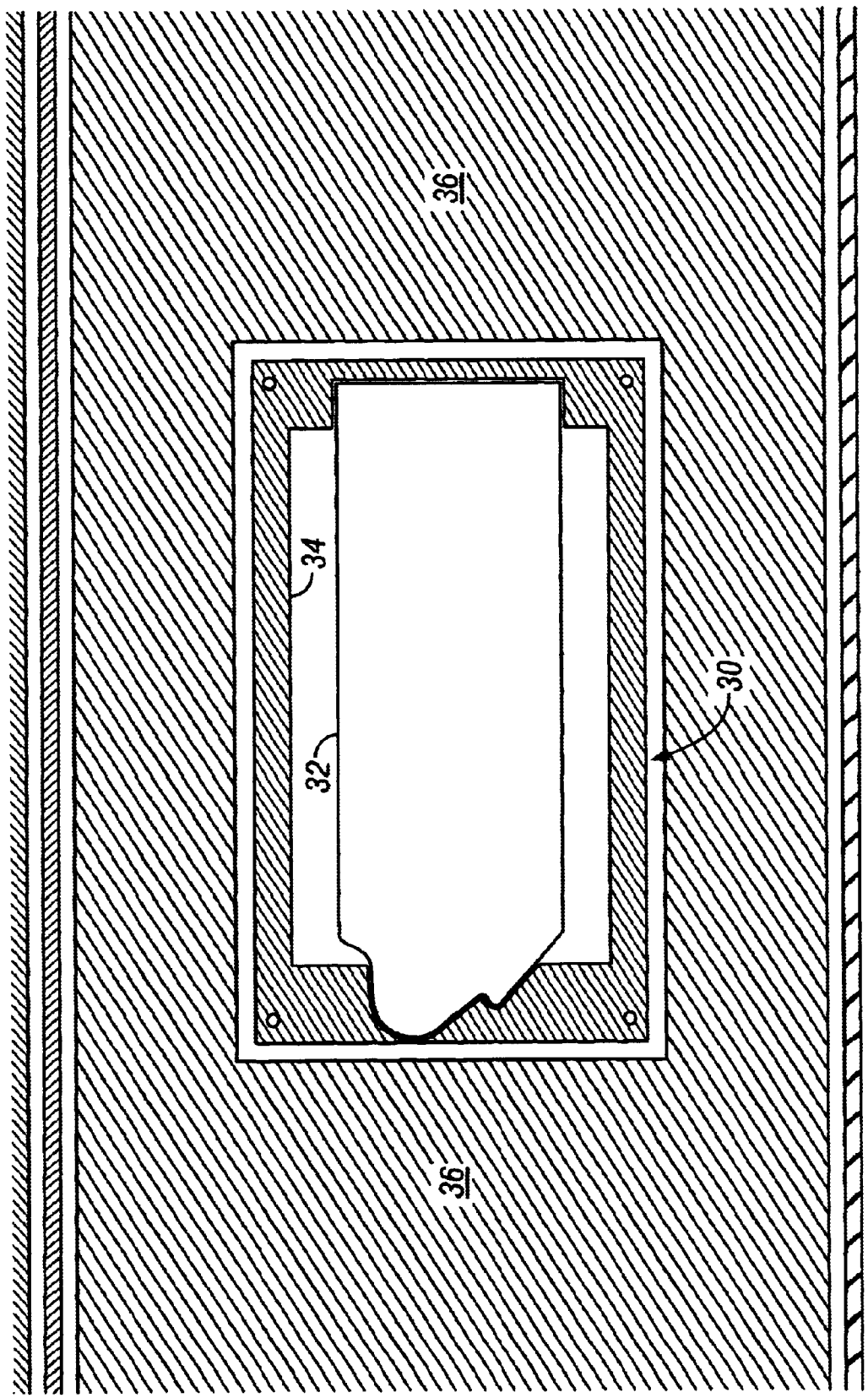

_US 6,645,389 B2_

METHOD OF DEMETALLIZING A WEB IN AN ETCHANT BATH AND WEB SUITABLE THEREFOR

CROSS-REFERENCE TO RELATED APPLICATIONS

This application claims the benefit of U.S. Provisional Patent Application No. 60/311,580, filed Aug. 10, 2001, Laurence M. C. Lai, "Metal-containing web having functional and non-functional etch-resistant patterns or etched features and process for making same,", and the benefit of U.S. Provisional Patent Application No. 60/311,397, filed Aug. 9, 2001. Laurence M. C. Lai, "Metal-containing web having functional and non-functional etch-resistant patterns, ", which are hereby incorporated herein by reference in their entirety.

BACKGROUND OF THE INVENTION

1. Field of the Invention

The present invention relates to selective chemical milling of etchable metal-containing material supported on a web of non-metallic material, and more particularly to webs having functional and non-functional etch-resistant patterns or etched features and processes using or making same.

2. Description of Related Art

Functional patterns formed into aluminum foil are used in a variety of products, including microwave plates, trays and bowls, planar speakers, electronic circuitry surveillance products used for shoplifting prevention in retail environments, and flexible heaters, just to name a few. Common processes to form these products includes chemical milling or chemical etching. This chemical process can be described as follow. A metallic foil of desired thickness is laminated to a suitable substrate and patterns of desired design are printed onto the foil surface with an etchant resistant protective coating. These functional patterns typically are placed as closely together as possible, subject to the shape of the functional patterns and the spacing requirements imposed by such operations as cutting the rolled up web into segments for subsequent handling and processing, which occur after the chemical etching process. The printed metallic foil is then introduced to the etching solution, where upon the uncoated area will be etched away, leaving the desired protected features behind. The etching solution can be acidic or alkaline in nature, depending on the type of metal being etched. The metal foil can be of different thickness, depending on the intended function of the desired product. Typical foil thicknesses are from about 1 micron to about 15 microns and greater for microwave applications, from about 5 microns to about 50 microns and greater for planar speakers and flexible heaters, and from about 5 microns to about 70 microns and greater for electronic article surveillance products. The web may then be wound up into a roll, which may be cut up into segments for subsequent handling and processing.

An example of a web used for making security tags is disclosed in U.S. Pat. No. 5,754,110, issued May 19, 1998 to Appalucci et al. The security tag has a resonant circuit on one surface of a substrate, and a guard member that surrounds but is electrically isolated from the resonant circuit. In one embodiment the guard member is a discontinuous conductive member. In another embodiment it is a non-conductive member comprising the same material as the substrate. The guard member functions to electrically isolate the resonant circuit to facilitate testing of the resonant circuit during the manufacturing process when the resonant circuit is in web form. The web is processed to form the resonant circuits and the guard members for each of the tags on it by the continuous spray etching apparatus disclosed in U.S. Pat. No. 3,913,219, issued Oct. 21, 1975 to Lichtblau.

A particularly useful continuous demetallizing process and apparatus are described in U.S. Pat. No. 5,340,436, which issued Aug. 23, 1994 to D. Gregory Beckett. The apparatus has, generally speaking, an elongate tank that holds a bath of aqueous etchant material. The web containing the metal layer to be etched initially is arranged in a roll. The web is taken off of the roll and printed with a pattern of etch-resistant coating designs defining areas not to be etched. The web is then guided into the bath at one end, guided either horizontally or sinusoidally through the bath, and removed from the bath and taken up on another roll at the opposing end of the bath. The web is driven along its path by any suitable drive mechanism. An example of a drive mechanism is a combination of driven belts and roller elements. The web passes between these elements, which engage the web and drive it.

Although the Beckett demetallizing process is effective and economical, it is desired to make this demetallizing process and others even more effective and economical, especially when such a process is used to etch a web that contains a thick metal layer or that becomes flimsy and difficult to handle while passing through the etchant bath.

BRIEF SUMMARY OF THE INVENTION

The present invention in one embodiment is a method of effecting selective demetallization of a web in an etchant bath to form a plurality of product units for products, the web having a layer of metal-containing material supported on flexible substrate layer. The method comprises establishing a pattern having a first part to define product units on the web, and a second part to define protected areas on the web outside of the product units for maintaining the etchant bath in a vital state over a long lifetime; placing etchant-resistant material on a first side of the web over the metal-containing layer in accordance with the pattern; passing the web in an immersed condition through the etchant bath to remove the metal-containing material from areas of the web not protected by the pattern; and removing the web from the etchant bath.

Another embodiment of the present invention is a method of effecting selective demetallization of a web in an etchant bath to form a plurality of product units for products, the web having a thick layer of metal-containing material supported on flexible substrate layer. The method comprises establishing a pattern having a first part to define product units on the web, and a second part to define protected areas on the web outside of the product units for preventing excessive heat generation in the etchant bath and maintaining the etchant bath stable and controllable; placing etchant-resistant material on a first side of the web over the metal-containing layer in accordance with the pattern; passing the web in an immersed condition through the etchant bath to remove the metal-containing material from areas of the web not protected by the pattern, whereupon the etchant bath is not overheated and remains stable and controllable; and removing the web from the etchant bath.

A further embodiment of the present invention is a method of effecting selective demetallization of a web in an etchant bath to form a plurality of product units for products, the web having a thick layer of metal-containing material supported on flexible substrate layer. The method comprises establishing a pattern having a first part to define product units on the web, and a second pan to define protected areas on the web outside of the product units for imparting predetermined flex characteristics to the web; placing etchant-resistant material on a first side of the metal-containing layer in accordance with the pattern; passing the web in an immersed condition through the etehant bath to remove the metal-containing material from areas of the web not protected by the pattern, whereupon the web acquires the predetermined flex characteristics; and removing the web from the etchant bath.

Placing etchant-resistant material on a first side of the metal-containing layer in accordance with the pattern; passing the web in an immersed condition through the etchant bath to remove the metal-containing material from areas of the web not protected by the pattern, whereupon the web acquires the predetermined flex characteristics; and removing the web from the etchant bath.

Yet another embodiment of the present invention is a method of effecting selective demetallization of a web in an etchant bath to form a plurality of product units for products, the web having a thick layer of metal-containing material supported on flexible substrate layer. The method comprises establishing a pattern having a first part to define product units on the web, and a second part to define protected areas on the web outside of the product units for preventing excessive heat generation in the etchant bath, maintaining the etchant bath stable, and controllable imparting predetermined flex characteristics to the web; placing etchant-resistant material on a first side of the metal-containing layer in accordance with the pattern; passing the web in an immersed condition through the etchant bath to remove the metal-containing material from areas of the web not protected by the pattern, whereupon the etchant bath is not overheated and remains stable and controllable, and the web acquires the predetermined flex characteristics; and removing the web from the etchant bath.

Another embodiment of the present invention is a metal-containing web comprising a substrate; a plurality of etched metal-containing first product units disposed on a first side of the substrate, adjacent ones of the first product units being contiguous over peripheral portions thereof and being separated over other peripheral portions thereof to gaps between the adjacent product units; and a plurality of first metal patches disposed on the first side of the substrate, at least one of the first metal patches being disposed in each of the gaps between the adjacent first product units to improve rigidity in the web.

Yet another embodiment of the present invention is a metal-containing web comprising a substrate; a plurality of etched metal-containing first features disposed on a first side of the substrate, each of the first features having a function in a product; and a metal-containing first field disposed on the first side of the substrate substantially throughout the web, at least a substantial portion of the first field having no function in a product and having discontinuities to establish predetermined flex characteristics in the web; wherein the first features are distributed through the first field.

A further embodiment of the present invention is a metal-containing web comprising a substrate; a plurality of etched metal-containing first features disposed on a first side of the substrate, each of the first features having a function in a product, and at least some of the first features being different than others of the first features; and a metal-containing first field disposed on the first side of the substrate substantially throughout the web, at least a substantial portion of the first field having no function in a product; wherein the first features are distributed through the first field.

Another embodiment of the present invention is a metal-containing web comprising a substrate; a plurality of etched metal-containing first features disposed on a first side of the substrate, each of the first features having a function in a product; and a metal-containing first field disposed on the first side of the substrate substantially throughout the web, at least a substantial portion of the first field having no function in a product; wherein the first features are distributed through the first field.

BRIEF DESCRIPTION OF THE SEVERAL VIEWS OF THE DRAWINGS

FIG. 3 is a more detailed plan view of an illustrative one of the product units of FIGS. 2A and 2B.

DETAILED DESCRIPTION OF THE INVENTION, INCLUDING THE BEST MODE

Figure 1:
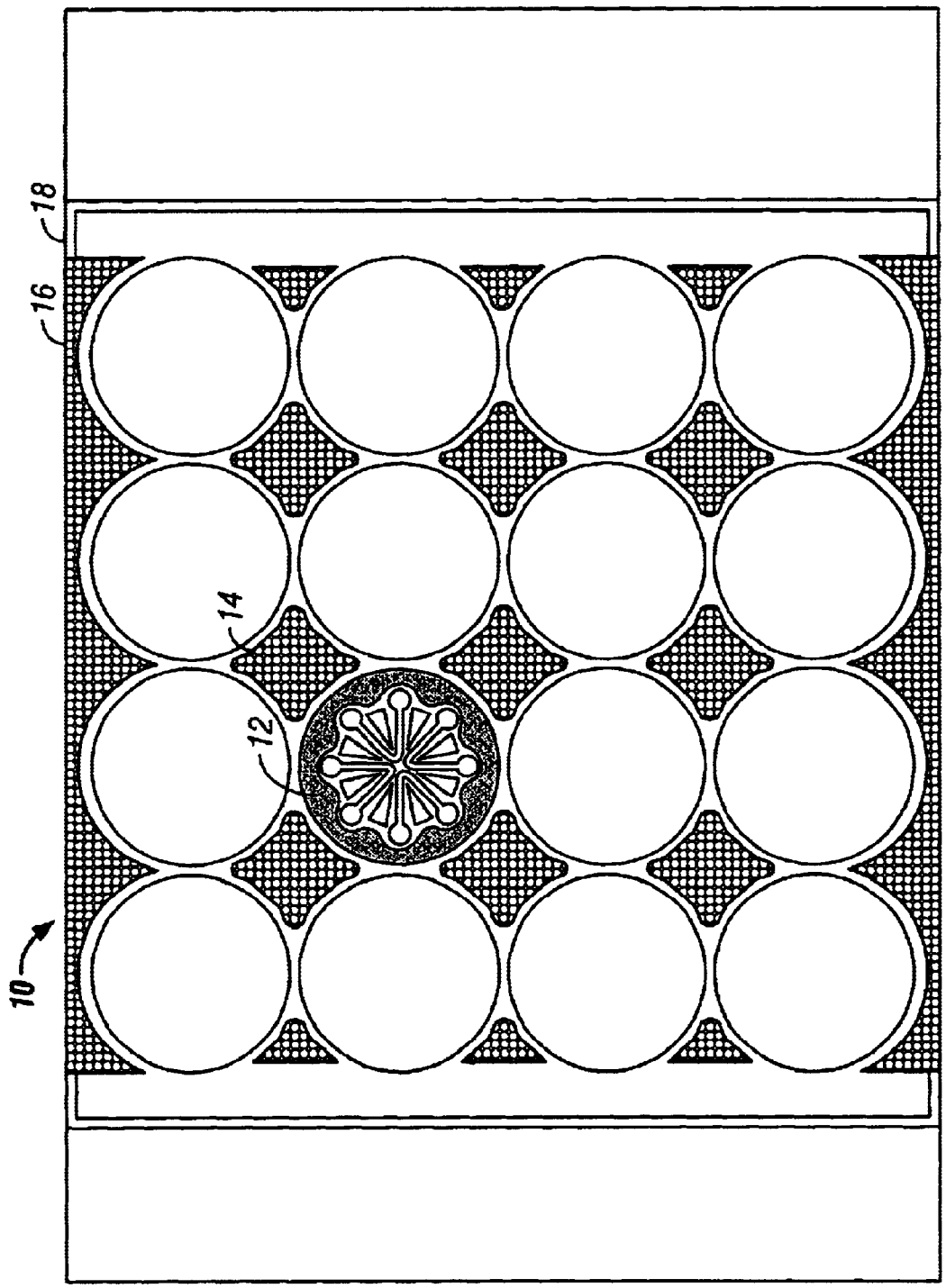
FIG. 1 is a plan view of one side of a web containing a number of circular product units.

A variety of etching bath-based demetallizing processes for making various products involve immersing a web of metal-containing material in a bath of aqueous etchant. The metal-containing material is protected by a pattern of etch-resistant material during the demetallizating process to form functional features having a function in the product in the metal-containing material when the web has been demetallized. The metal-containing material is also protected by a pattern of etch-resistant material over areas of the metal-containing material that serve no function in the product, but rather function in one or more ways to improve the chemical milling process, such as, for example, by extending the etchant bath life, preventing excessive heat generation in the etchant bath, maintaining the etchant bath stable and controllable, increasing web rigidity, and imparting predetermined flex characteristics to the web.

Examples of a particularly effective and economical continuous demetallizing process and of equipment useful for practicing the process are described in U.S. Pat. No. 5,340, 436, which is entitled "Demetallizing Procedure" and issued Aug. 23, 1994 to D. Gregory Beckett, which is hereby incorporated herein in its entirety by reference. The '436 patent involves the selective demetallizing of an etchable metal layer supported on a layer of suitable material or a self-supporting etchable metal layer. In one embodiment, a web of polymeric material bearing the etchable metal layer, illustratively aluminum, has a pattern of etch-resistant material applied to it. Then, the web is immersed in and passed through a bath of aqueous etchant, illustratively an aqueous sodium hydroxide base solution at an elevated temperature, for a time at least sufficient to remove the etchable metal from non-protected areas of the web. The demetallized web is then washed and dried.

A metal-containing web that has etch-resistant resist patterns for forming functional and non-functional features in the continuous etch processes of the '436 patent and others like it is now described. The functional features serve various well known functions in the final product, including shielding, localized heating, standing wave modification, and attenuation in microwave applications, magnetic field generation in planar speakers, heat generation in flexible heaters, and field disruption in electronic circuitry surveillance. The non-functional features at least in large part serve no function in the final product and are removed before the functional features are incorporated into the product, preferably by trimming using any suitable technique. However, they are useful for controlling the flex characteristics of the web as it becomes etched and are useful in various ways in bath-based etching processes such as the continuous etch processes.

The initial web laminate is formed by mounting a metal foil or a metal-containing foil onto a suitable substrate, such as polyester or polymeric material. While any suitable method may be used, a suitable well known process for aluminum involves laminating aluminum foil to a layer of polyester or polymeric material using a dry bond adhesive, in a manner well known in the art. The foil thickness for use in continuous etch processes and equipment like that described in the '436 patent is generally determined by the capabilities of the foil manufacturer and the limitations of the web handling components in handling rolls of web layer materials and the finished web. Presently, these factors establish a foil thickness in the range of from about 1 micron to about 75 microns. The actual thickness of foil used in the web depends on the application. Illustratively, for microwave applications, aluminum foil of about 1 micron to about 15 microns thickness and greater is mounted to a PET polyester film of about 48 gauge. Illustratively, for planar speaker diaphragms, aluminum foil of about 5 microns to about 50 microns thickness and greater is mounted to a PEN film of about 48 gauge. Illustratively, for electronic article surveillance products, aluminum foil of from about 5 microns to about 70 microns thickness and greater is mounted to a PET polyester film of about 48 gauge. Next, a protective coating of resin or any suitable etch-resistant material is printed, sprayed, or otherwise applied onto the foil side of the web to form a protective etch mask, in a manner well known in the art. A suitable etch-resistant material for a sodium hydroxide base solution etchant is a vinyl chloride co-polymer resin. The thickness of the etch-resistant layer is determined by the strength and temperature of the etchant along with the time over which the etch-resistant material is exposed to the etchant, in a manner well known in the art. The protective coating is dried and the web either is rolled onto a spindle for later etching in a continuous demetallizing process, or is directly introduced into the continuous demetallizing process. While the particular size of the web depends on the particular equipment used in the process, a typical web size for the process and equipment described in the '436 patent is from about 31 to about 36 inches wide and about 5000 feet to about 10,000 feet long, rolled onto a spindle in a manner well known in the art.

Next, the web is etched in the continuous demetallizing process, in a manner well known in the art.

Subsequent steps depend on the product being made. Where the product is for microwave cooking applications, illustratively the web is laminated using a wet bond adhesive to a paper product having any suitable thickness, typically from about 20 pound paper to about 24 point paperboard but also thicker, and various product units which include one or more of the functional features are cut out using any suitable technique such as a die cutting machine or robotic cutting, as are well known in the art. Microwave cooking articles are available from a variety of manufacturers, including Graphic Packaging Corporation of Golden, Colo. Where the product is for planar speaker applications, the functional features include circuit elements, and various product units which includes respective circuits formed from one or more of the circuit elements are cut out using any suitable technique such as a die cutting machine or robotic cutting, as are well known in the art, and suitably packaged into a speaker housing. Planar speaker drivers are available from a variety of manufacturers, including American Technology Corporation of San Diego, Calif. Where the product is for electronic article surveillance products, the functional features include circuit elements, and various product units which includes respective circuits formed from one or more of the circuit elements are cut out using any suitable technique such as a die cutting machine or robotic cutting, as are well known in the art, and suitably packaged. The finished products tend to be about one to about one and a half inch square, but other sizes and shapes are also used. Electronic article surveillance products are available from a variety of manufacturers, including Unisen Corporation of Boca Raton, Fla.

Although the non-functional features at least in large part serve no function in the product, they are useful in various ways in the demetallizing process. For example, it has been found that on occasion, the drive mechanism used to advance the web through the etchant bath skews the web, thereby causing the web to bulge and crease as it is rolled up. Inclusion of non-functional features with the functional features during processing improves the rigidity of the web for better tension control, especially in webs having a thin metal-containing layer, thereby stabilizing the web against skew as it is being drawn through the etching equipment, and avoiding bulging and creasing.

A variety of suitable non-functional filler patterns may be used, depending on the layout of the functional filler patterns. For example, FIG. 1 shows an illustrative plate for a gravure cylinder, which is suitable for printing a section 10 of a web (such as might be made by one rotation of a gravure cylinder). The gravure cylinder is 46 inches wide, while the web section 10 is about 31.75 inches wide and 31.215 inches long (there are a great many such sections along the length of a typical web). Aluminum registration marks and eye lines useful in the fabrication process are also shown; a registration mark is indicated at 18. The web section 10 has a number of circular product units such as 12, which are uniformly arranged on the web section 10. Each product unit includes one or more functional features which are useful for microwave cooking applications. The product units are spaced apart from one another at their closest point by 0.25 inches, and from the registration mark 18 by 0.625 inches. However, because of the circular shape, significant gaps are present between peripheral portions of the circular product units 12. The circular shape is illustrative of product units that do not pack well, and many other shapes also do not pack well, such as, for example, ovals, irregular shapes, and shapes of different size. Between the product units (such as 12) are interspersed non-functional features such as features 14 and 16, within the gaps between the product units. The features 14 and 16 are non-functional as far as the product is concerned, but are very useful to improve the movement of the web through the equipment, especially when the web is wide and the length being handled by the equipment is large.

It has also been found that control of the demetallizing process becomes increasing difficult when etching thick metal-containing layers. In the case of a thick aluminum foil web, for example, the temperature of the aqueous sodium hydroxide base solution preferably is made as elevated as is practical to achieve a high etch rate so that optimal production may be maintained. For example, a sodium hydroxide base solution temperature in the range of about 155 degrees Fahrenheit to about 158 Fahrenheit is suitable for accelerating the rate of the chemical reaction. However, because the chemical reaction is exothermic, the additional heat generated at an increased rate due to the faster etch could exceed the capability of the heat exchangers in the process equipment to remove the heat.

Inclusion of non-functional features with the functional features during processing improves the chemical aspects of the demetallizing process in a variety of ways, including (1) decreasing the heat release by the exothermic reaction of the metal dissolution to enable better temperature control; (2) increasing the stability and controllability of the etching bath to achieve better feature quality and definition; (3) reducing unnecessary consumption of etching solution; and (4) extending the life span of the etching bath to improve productivity. As a result, an elevated bath temperature may be maintained so that a high etch rate is realized without jeopardizing control of the demetallizing process. These process benefits become increasingly more important as the metal layer becomes thicker. Where the metal layer is aluminum, these process benefits become especially significant at a metal layer thickness of about 25 microns, and become even more beneficial at greater thicknesses. Web rigidity also is improved.

Figure 2A:
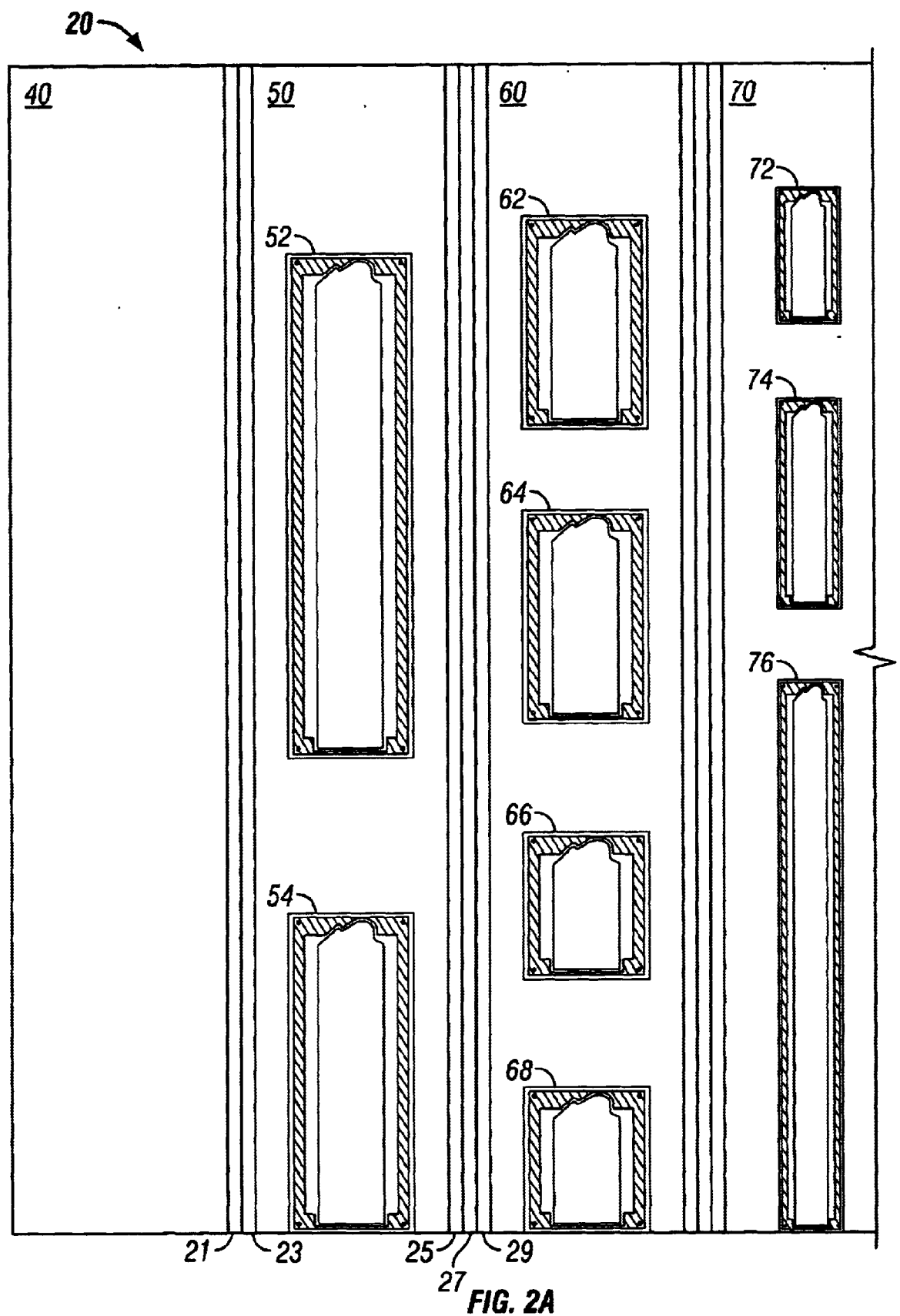
FIGS. 2A and 2B are a plan view of one side of a web containing a number of elongated product units.
Figure 2B:
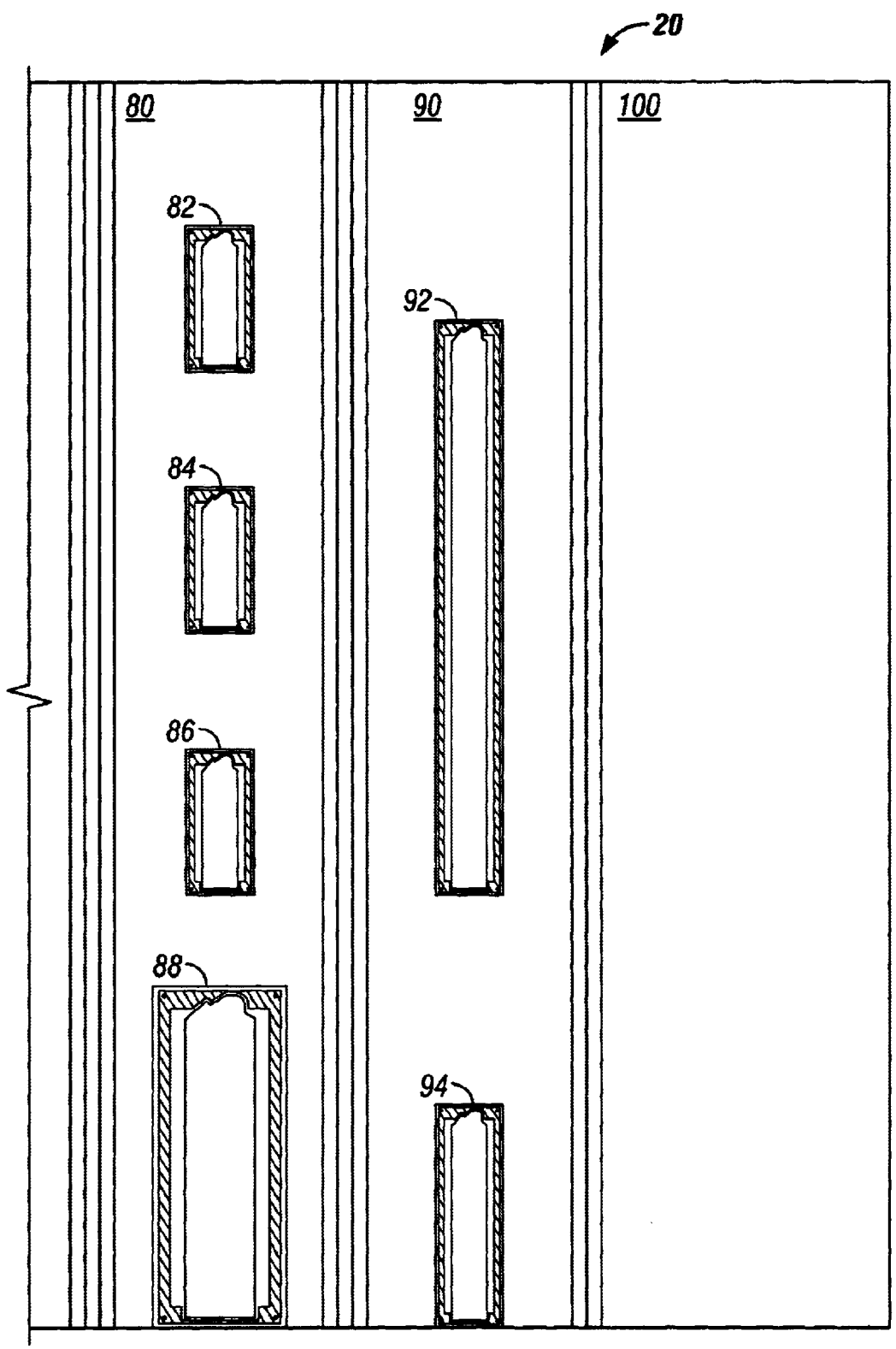

FIGS. 2A and 2B show an illustrative plate for a gravure cylinder, which is suitable for printing an illustrative section 20 of a web (such as might be made by one rotation of a gravure cylinder). The gravure cylinder is 46 inches wide, and the web section 10 is about 31 inches wide and 28.75 inches long (there are a great many such sections along the length of a typical web). The web section 20 has a number of elongated rectangular product units such as 52, 54, 62, 64, 66, 68, 72, 74, 76, 82, 84, 86, 88, 92 and 94, which are useful for planar speakers. The various product units shown in FIGS. 2A and 2B are of different shape and so are arranged differently on the web 20. If the various product units were identical, they could if desired be uniformly arranged in the manner shown for the web section 10 of FIG. 1. The product units 52 and 54 are shown set within non-functional feature 50; the product units 62, 64, 66 and 68 are shown set within non-functional feature 60; the product units 72, 74 and 76 are shown set within non-functional feature 70; the product units 82, 84, 86 and 88 are shown set within non-functional feature 80; and the product units 92 and 94 are shown set within non-functional feature 90. While the various product units 52, 54, 62, 64, 66, 68, 72, 74, 76, 82, 84, 86, 88, 92 and 94 are shown as being fully set within their respective non-functional features 50, 60, 70, 80 and 90, in general they need not be completely surrounded. Areas 40 and 100, which are respectively 7 inches and 8 inches wide, show the full extent of the plate, which is 46 inches. The features 50, 60, 70, 80 and 90 are non-functional as far as the product units are concerned, but they are very useful to improve the fabrication process. The structures indicated at 21 and 27 are eye lines. Etched regions 23, 25 and 29 are provided so that after the entire web is rolled up, it can be slit into smaller rolls for subsequent processing.

While FIGS. 1, 2A and 2B show only one side of the web sections 10 and 20, it will be appreciated that that product units shown in FIGS. 1, 2A and 2B may have metal-containing features on the side opposite that illustrated, and that the non-functional features shown on the side illustrated in FIGS. 1, 2A and 2B may have corresponding non-functional features on the side opposite that illustrated. Security tag product units commonly have functional features on both sides. A example of a web with circuit product units having thick functional features on one or both sides and for which non-functional features may be used on one or both sides to particular advantage is described in U.S. patent application Ser. No. 09/989,898, filed Nov. 19, 2001 (Lai et al., "Manufacture having double sided features in a metal-containing web and manufacture and method for forming same in a liquid-based etch process"), which hereby is incorporated herein by reference thereto in its entirety.

FIG. 3 is an enlargement of an illustrative product unit 30 of the type shown in FIGS. 2A and 2B. The product unit 30 includes a circuit 32 set within a frame 34. The product unit 30 is set within a cavity centered in the non-functional feature 36, but could be located near or at an edge of the non-functional feature 36 or at an intersection between two or more non-functional features.

The improvements in the etch process are roughly proportional to the amount of space occupied by the protected non-functional features. While the proportion of space on the web occupied by the non-functional features versus the functional features and the spacing between the non-functional features and the functional features is not critical, it is preferable to set these factors (a) to minimize the minimum amount of aluminum to be etched; (b) maintain sufficient space between non-functional features and functional features for trimming purposes; and (c) satisfy the demetallizing process requirements for control and throughput.

The dramatic impacts on the continuous chemical milling process of etching thicker foils is illustrated in Table 1 below. Table 1 shows the amount of hydrogen generated in cubic feet per minute, the exhaust needed for 97% air dilution in cubic feet per minute, the heat generated in kilo-calories per minute, and the caustic bath life span in hours for four different foil thicknesses of 7 microns, 17 microns, 25 microns, and 38 microns and for three different aluminum etch areas, 40%, 60% and 80%. Illustrative fixed parameters for Table 1 are a bath capacity of 6000 liters, an initial caustic concentration of 30% (300 grams/liter, 7.5N), aluminum concentration in discarded bath solution of 66 grams per liter (0.22 ratio as Al/NaOH), bath temperature of 150 degrees F, web speed of 50 feet/minute, web width of 32 inches, heat of dissolution of 104 Kilocalories per mole, hydrogen evolution of 1.25 liters/gram of aluminum dissolved, and hydrogen dilution of 3%.

TABLE 1

| FOIL THICKNESS | AL AREA ETCHED | HYDROGEN GENERATED | EXHAUST | HEAT GENERATED | CAUSTIC BATH LIFE |
|---|---|---|---|---|---|
| 7 um | 40 | 4.1 | 137 | 360 | 70.5 |
|  | 60 | 6.1 | 205 | 540 | 47.25 |
|  | 80 | 8.2 | 270 | 720 | 35.25 |
| 17 um | 40 | 10.0 | 332 | 874 | 29.1 |
|  | 60 | 14.9 | 497 | 1310 | 19.4 |
|  | 80 | 19.9 | 663 | 1750 | 14.5 |

TABLE 1-continued

| FOIL THICKNESS | AL AREA ETCHED | HYDROGEN GENERATED | EXHAUST | HEAT GENERATED | CAUSTIC BATH LIFE |
|---|---|---|---|---|---|
| 25 um | 40 | 14.6 | 488 | 1290 | 19.8 |
|  | 60 | 22.0 | 731 | 1930 | 13.2 |
|  | 80 | 29.3 | 975 | 2570 | 9.9 |
| 38 um | 40 | 22.3 | 741 | 1950 | 13.0 |
|  | 60 | 33.4 | 1110 | 2930 | 8.7 |
|  | 80 | 44.5 | 1480 | 3910 | 6.5 |

The trends shown in Table 1 illustrate the usefulness of providing nonfunctional features to improve all aspects of the chemical milling process. Assume for the purpose of illustration that a particular pattern design without nonfunctional features requires an aluminum area etched of 80%. The impact on the etching process of this large an area etch when 7 micron foil is being etched is as follows: hydrogen generation is 8.2 cubic feet per minute, exhaust is 270 cubic feet per minute, heat generated is 720 Kcal per minute, and caustic bath life span is 35.25 hours. In stark contrast, the impact on the etching process for a 38 micron foil etch is much more severe: hydrogen generation is 44.5 cubic feet per minute, exhaust is 1480 cubic feet per minute, heat generated is 3910 Kcal per minute, and caustic bath life span is 6.5 hours. However, if adding nonfunctional features to the web brings the aluminum area etched down to 40%, for example, the impact on the etch process is significantly lessened: hydrogen generation is 22.3 cubic feet per minute, exhaust is 741 cubic feet per minute, heat generated is 1950 Kcal per minute, and caustic bath life span is 13.0 hours.

Figure 4:
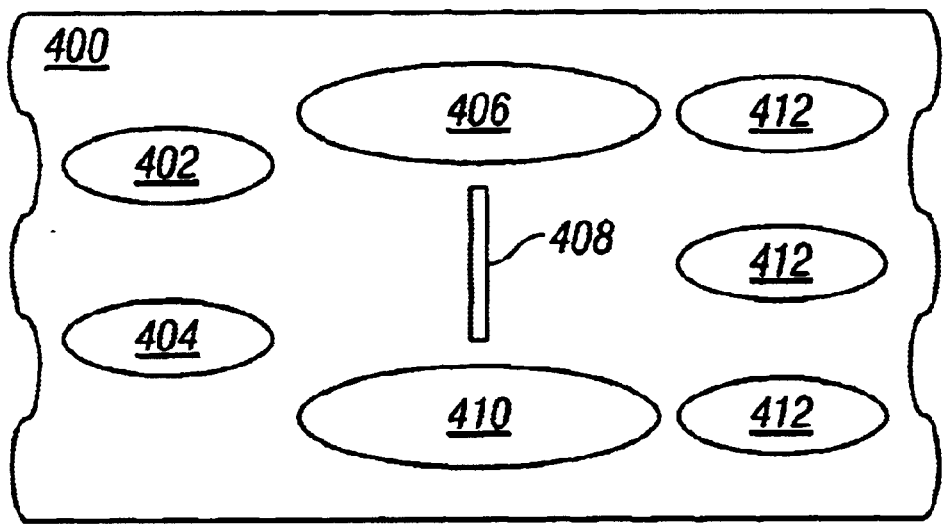
FIG. 4 is a plan view of a web having a slit-like discontinuity in an otherwise continuous field of a section of the web.
Figure 17:
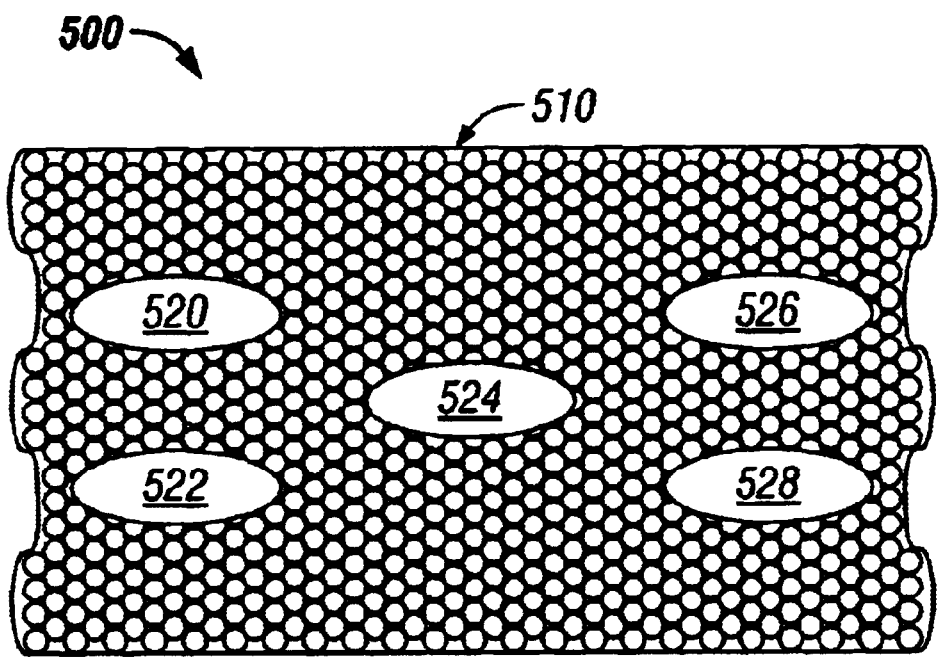
FIG. 17 is a plan view of a web having a solid form of the small nonfunctional features of FIG. 8 in the field of a section of the web.
Figure 5:
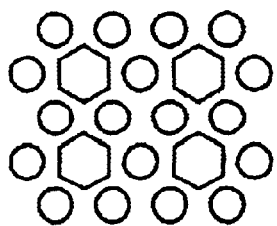
FIGS. 5–16 are plan views of various small nonfunctional features suitable for use in a field of a web.
Figure 6:
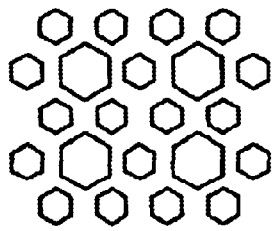
Figure 7:
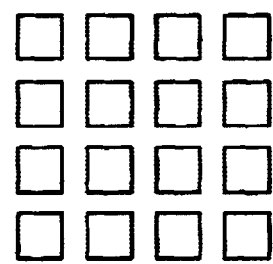
Figure 8:
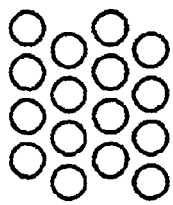
Figure 9:
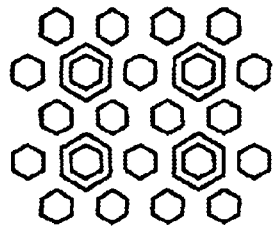
Figure 10:
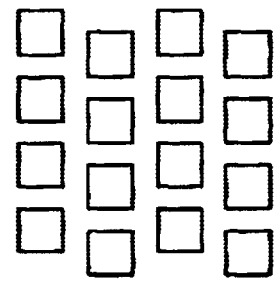
Figure 11:
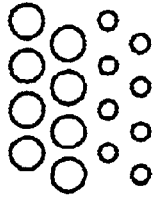
Figure 12:
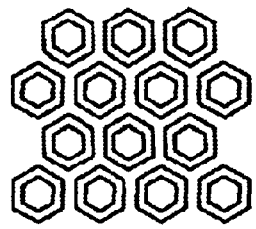
Figure 13:
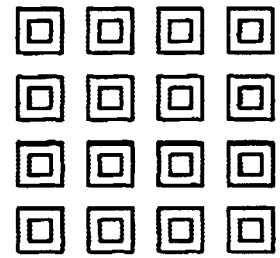
Figure 14:
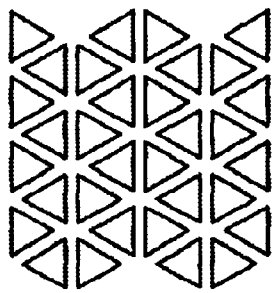
Figure 15:
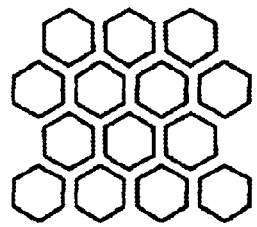
Figure 16:
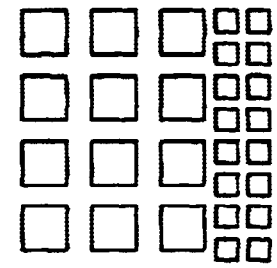

While the field of the web, or the metal-containing portion of the web exterior to the product units, can be a single continuous nonfunctional feature or a few continuous nonfunctional features as shown in FIG. 2, and while such a web may have satisfactory flex characteristics, especially if the product units are spaced well apart, it may be desirable under some circumstances to finely adjust the flex characteristics of the web. This is so when, for example, a uniform distribution of the tension along the web is important, and is achieved by providing discontinuities in the field. Discontinuities can be achieved in any one of a numerous ways, or combinations thereof. For example, the embodiment in FIG. 4 shows an otherwise continuous metal containing field 400 with a single slit-like discontinuity 408 between two large elongated product units 406 and 410, the other product units being small units 402, 404, 412, 414 and 416. Discontinuities can also be achieved using a number of small nonfunctional features. Various examples are shown in FIGS. 5–16, where the shapes show may be solid or openings in a patterned framework, depending on the flex characteristics sought. An example of the use of small disk-like features such as shown in FIG. 8 in a web is shown in FIG. 17, in which a web 500 contains a variety of product units 520, 522, 524, 526 and 528 within a field 510. To achieve substantially uniform distribution of tension along a web, the flex characteristics of the discontinuous field are selected to be similar to the flex characteristics of the function fields to which they are in proximity. It will be appreciated that to achieve substantially uniform tension through a web may require the use of different nonfunctional features throughout the web, although in some circumstances use of the same nonfunctional features throughout may be adequate.

It will be appreciated that the type of metal or metal-containing material and the substrate described herein are illustrative, as are the various thicknesses. The choice as to material and thickness depends on the application and the temperature of the demetallizing process. For example, polyethylene terepthalate ("PET") is suitable for many applications over a wide range of process temperatures, while Kaladex™ polyethylene naphthalate ("PEN") and Kapton™ polyimide, which are available from E.I. du Dupont de Nemours and Company of Wilmington, Del., are especially suitable where metal-containing webs are processed at elevated bath temperatures.

The scope of our invention is set forth in the following claims. The description of the various embodiments set forth herein is illustrative of our invention and is not intended to limit the scope thereof. Variations and modifications of the embodiments disclosed herein will become apparent to those of ordinary skill in the art upon reading this patent document, and alternatives to and equivalents of the various elements of the embodiments will be known to those of ordinary skill in the art. These and other variations and modifications of the embodiments disclosed herein may be made without departing from the scope and spirit of the invention as set forth in the following claims.

What is claimed is:

1. A method of effecting selective demetallization of a web in an etchant bath to form a plurality of product units for products, the web having a layer of metal-containing material supported on flexible substrate layer, the method comprising:

establishing a pattern having a first part to define product units on the web, and a second part to define protected areas on the web outside of the product units for maintaining the etchant bath in a vital state over a long lifetime;

placing etchant-resistant material on a first side of the web over the metal-containing layer in accordance with the pattern;

passing the web in an immersed condition through the etchant bath to remove the metal-containing material from areas of the web not protected by the pattern; and removing the web from the etchant bath.

2. The method of claim 1 wherein:

the metal-containing material is aluminum;

the etchant bath is aqueous sodium hydroxide solution; and the etchant resistant material is sodium hydroxide-resistant material.

3. The method of claim 1:

wherein the first part of the pattern comprises a plurality of first sub-patterns;

further comprising arranging the first sub-patterns throughout the pattern wherein at least some of the first sub-patterns are separated by portions of the second part of the pattern.

4. The method of claim 3:
wherein the second part of the pattern comprises a continuous protective region extending throughout the web;
further comprising distributing the first sub-patterns throughout the continuous protective region.

5. The method of claim 3 wherein the second part of the pattern comprises a plurality of second sub-patterns, further comprising:
distributing the first sub-patterns throughout the web; and
distributing the second sub-patterns between the first sub-patterns.

6. The method of claim 3 wherein at least some of the first sub-patterns have different shapes and sizes.

7. The method of claim 3 wherein the first sub-patterns are of uniform shape and size.

8. The method of claim 3 wherein:
the first sub-patterns comprise circular microwave-interactive patterns of uniform shape and size; and
the second sub-patterns comprises metal patches;
further comprising distributing the metal patches between the circular microwave-interactive patterns.

9. The method of claim 1 further comprising:
establishing an additional pattern having a third part to define product units on the web, and a fourth part to define protected areas on the web outside of the product units for maintaining the etchant bath in a vital state over a long lifetime; and
placing etchant-resistant material over the metal-containing layer on a second side of the web in accordance with the additional pattern.

10. A method of effecting selective demetallization of a web in an etchant bath to form a plurality of product units for products, the web having a thick layer of metal-containing material supported on flexible substrate layer, the method comprising:
establishing a pattern having a first part to define product units on the web, and a second part to define protected areas on the web outside of the product units for preventing excessive heat generation in the etchant bath and maintaining the etchant bath stable and controllable;
placing etchant-resistant material on a first side of the web over the metal-containing layer in accordance with the pattern;
passing the web in an immersed condition through the etchant bath to remove the metal-containing material from areas of the web not protected by the pattern, whereupon the etchant bath is not overheated and remains stable and controllable; and
removing the web from the etchant bath.

11. The method of claim 10 wherein:
the metal-containing material is aluminum having a thickness equal to or greater than about 25 microns;
the etchant bath is aqueous sodium hydroxide solution; and
the etchant resistant material is sodium hydroxide-resistant material.

12. The method of claim 10:
wherein the first part of the pattern comprises a plurality of first sub-patterns;
further comprising arranging the first sub-patterns throughout the pattern wherein at least some of the first sub-patterns are separated by portions of the second part of the pattern.

13. The method of claim 10:
wherein the second part of the pattern comprises a continuous protective region extending throughout the web;
further comprising distributing the first sub-patterns throughout the continuous protective region.

14. The method of claim 10 wherein the second part of the pattern comprises a plurality of second sub-patterns, further comprising:
distributing the first sub-patterns throughout the web; and
distributing the second sub-patterns between the first sub-patterns.

15. The method of claim 10 wherein at least some of the first sub-patterns have different shapes and sizes.

16. The method of claim 10 wherein the first sub-patterns are of uniform shape and size.

17. The method of claim 10 wherein:
the first sub-patterns comprise elongated electronic circuits, at least some having different shapes and sizes; and
the second part of the pattern comprises a continuous protective region.

18. The method of claim 10 wherein:
the first sub-patterns comprise elongated electronic circuits, at least some having different shapes and sizes; and
the second part of the pattern comprises a discontinuous protective region.

19. The method of claim 10 further comprising:
establishing an additional pattern having a third part to define product units on the web, and a fourth part to define protected areas on the web outside of the product units for preventing excessive heat generation in the etchant bath and maintaining the etchant bath stable and controllable; and
placing etchant-resistant material on a second side of the web over the metal-containing layer in accordance with the additional pattern.

20. A method of effecting selective demetallization of a web in an etchant bath to form a plurality of product units for products, the web having a thick layer of metal-containing material supported on flexible substrate layer, the method comprising:
establishing a pattern having a first part to define product units on the web, and a second part to define protected areas on the web outside of the product units for imparting predetermined flex characteristics to the web;
placing etchant-resistant material on a first side of the metal-containing layer in accordance with the pattern;
passing the web in an immersed condition through the etchant bath to remove the metal-containing material from areas of the web not protected by the pattern, whereupon the web acquires the predetermined flex characteristics; and
removing the web from the etchant bath.

21. The method of claim 20 wherein:
the metal-containing material is aluminum having a thickness equal to or greater than about 25 microns;
the etchant bath is aqueous sodium hydroxide solution; and
the etchant resistant material is sodium hydroxide-resistant material.

22. The method of claim 20 wherein:
each of the product units has a particular flex characteristic after the passing step; and
the pattern establishing step comprises selecting sub-patterns for the second part of the pattern to impart flex characteristics to the web in proximity to the product units that are locally similar to the flex characteristics of the product units after the passing step.

23. The method of claim 22:
wherein the first part of the pattern comprises a plurality of first sub-patterns;
further comprising arranging the first sub-patterns throughout the pattern wherein at least some of the first sub-patterns are separated by portions of the second part of the pattern.

24. The method of claim 22 wherein the second part of the pattern comprises a plurality of second sub-patterns, further comprising:
distributing the first sub-patterns throughout the web; and
distributing the second sub-patterns between the first sub-patterns.

25. The method of claim 22 wherein at least some of the first sub-patterns have different shapes and sizes.

26. The method of claim 22 wherein the first sub-patterns are of uniform shape and size.

27. The method of claim 22 wherein:
the first sub-patterns comprise elongated electronic circuits, at least some having different shapes and sizes; and
the second part of the pattern comprises a discontinuous protective region.

28. The method of claim 20 further comprising:
establishing an additional pattern having a third part to define product units on the web, and a fourth part to define protected areas on the web outside of the product units for imparting predetermined flex characteristics to the web; and
placing etchant-resistant material on a second side of the metal-containing layer in accordance with the additional pattern.

29. A metal-containing web comprising:
a substrate;
a plurality of etched metal-containing first product units disposed on a first side of the substrate, adjacent ones of the first product units being contiguous over peripheral portions thereof and being separated over other peripheral portions thereof to gaps between the adjacent product units; and
a plurality of first metal patches disposed on the first side of the substrate, at least one of the first metal patches being disposed in each of the gaps between the adjacent first product units to improve rigidity in the web.

30. The web of claim 29 wherein the first product units comprise a plurality of circular microwave-interactive patterns.

31. The web of claim 29 wherein the first product units comprise a plurality of poorly packing product units.

32. The web of claim 29 further comprising:
a plurality of etched metal-containing second product units disposed on a second side of the substrate, adjacent ones of the second product units being contiguous over peripheral portions thereof and being separated over other peripheral portions thereof to gaps between the adjacent second product units; and
a plurality of second metal patches disposed on the second side of the substrate, at least one of the second metal patches being disposed in each of the gaps between the adjacent second product units to improve rigidity in the web.

33. A metal-containing web comprising:
a substrate;
a plurality of etched metal-containing first features disposed on a first side of the substrate, each of the first features having a function in a product; and
a metal-containing first field disposed on the first side of the substrate substantially throughout the web, at least a substantial portion of the first field having no function in a product and having discontinuities to establish predetermined flex characteristics in the web;
wherein the first features are distributed through the first field.

34. The web of claim 33 wherein:
each of the first features has a particular flex characteristic; and
the discontinuities in the field impart flex characteristics to the web in proximity to the first features that are locally similar to the flex characteristics of the first features.

35. The web of claim 33 wherein the first field comprises an array of solid forms of a same or similar size.

36. The web of claim 33 wherein the first field comprises an array of solid forms, at least some of the solid forms being of different sizes.

37. The web of claim 33 wherein the first field comprises an array of solid forms of a same or similar shape.

38. The web of claim 33 wherein the first field comprises an array of solid forms, at least some of the solid forms being of different shapes.

39. The web of claim 33 wherein the first field comprises a open patterned framework containing a plurality of openings, the openings being of a same or similar size.

40. The web of claim 33 wherein the first field comprises a open patterned framework containing a plurality of openings, at least some of the openings being of different sizes.

41. The web of claim 33 wherein the first field comprises a open patterned framework containing a plurality of openings, the openings being of a same or similar shape.

42. The web of claim 33 wherein the first field comprises a open patterned framework containing a plurality of openings, at least some of the openings being of different shapes.

43. The web of claim 33 further comprising:
a plurality of etched metal-containing second features disposed on a second side of the substrate, each of the second features having a function in a product; and
a metal-containing second field disposed on the second side of the substrate substantially throughout the web, at least a substantial portion of the second field having no function in a product and having discontinuities to establish the predetermined flex characteristics in the web;
wherein the second features are distributed through the second field.

44. A metal-containing web comprising:
a substrate;
a plurality of etched metal-containing first features disposed on a first side of the substrate, each of the first features having a function in a product, and at least some of the first features being different than others of the first features; and a metal-containing first field disposed on the first side of the substrate substantially throughout the web, at least a substantial portion of the first field having no function in a product;

wherein the first features are distributed through the first field.

45. The web of claim 44 wherein the field comprises a single extended feature, each of the first features being bounded at least in major part by a portion of the extended feature.

46. The web of claim 44 wherein the first field comprises a plurality of sub-features interspersed among the first features.

47. The web of claim 44 wherein the first features are distinct from the first field.

48. The web of claim 44 wherein the first features are aluminum.

49. The web of claim 44 further comprising:

a plurality of etched metal-containing second features disposed on a second side of the substrate, each of the second features having a function in a product; and a metal-containing second field disposed on the first side of the substrate substantially throughout the web, at least a substantial portion of the second field having no function in a product;

wherein the first features are distributed through the second field.

50. A metal-containing web comprising:

a substrate;

a plurality of etched metal-containing first features disposed on a first side of the substrate, each of the first features having a function in a product; and a metal-containing first field disposed on the first side of the substrate substantially throughout the web, at least a substantial portion of the first field having no function in a product;

wherein the first features are distributed through the first field.

51. The web as in claim 50 further comprising:

a plurality of etched metal-containing second features disposed on a second side of the substrate, each of the second features having a function in a product; and a metal-containing second field disposed on the second side of the substrate substantially throughout the web, at least a substantial portion of the second field having no function in a product;

wherein the second features are distributed through the second field.

52. A method of effecting selective demetallization of a web in an etchant bath to form a plurality of product units for products, the web having a thick layer of metal-containing material supported on flexible substrate layer, the method comprising:

establishing a pattern having a first part to define product units on the web, and a second part to define protected areas on the web outside of the product units for preventing excessive heat generation in the etchant bath, maintaining the etchant bath stable, and controllable imparting predetermined flex characteristics to the web;

placing etchant-resistant material on a first side of the metal-containing layer in accordance with the pattern;

passing the web in an immersed condition through the etchant bath to remove the metal-containing material from areas of the web not protected by the pattern, whereupon the etchant bath is not overheated and remains stable and controllable, and the web acquires the predetermined flex characteristics; and removing the web from the etchant bath.

* * * * *